April 8, 1924.
W. HENRY
1,489,527
CARRYALL FOR MOTOR VEHICLES
Filed March 24, 1922    3 Sheets-Sheet 1
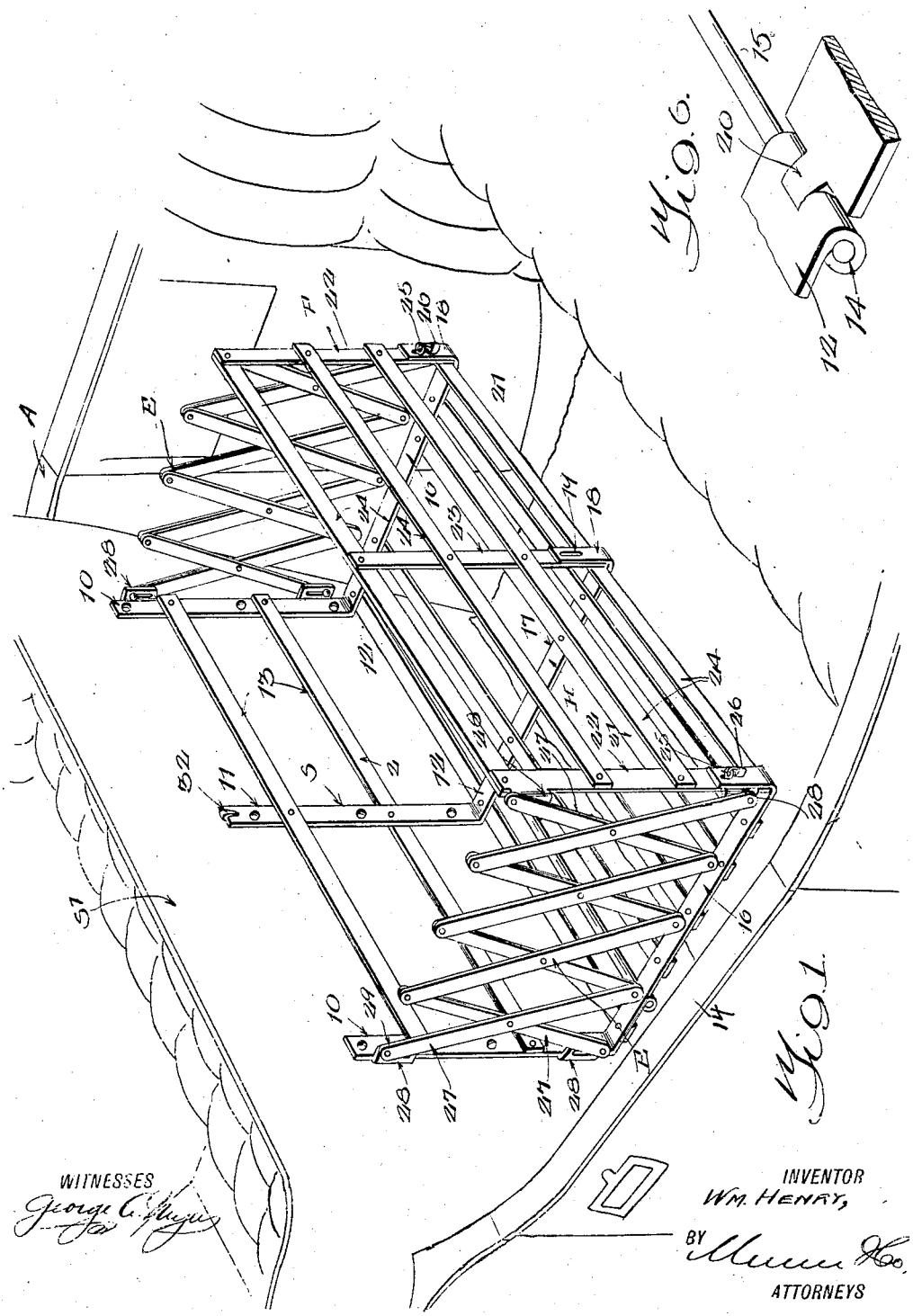

April 8, 1924.
W. HENRY
CARRYALL FOR MOTOR VEHICLES
Filed March 24, 1922
1,489,527
3 Sheets-Sheet 2
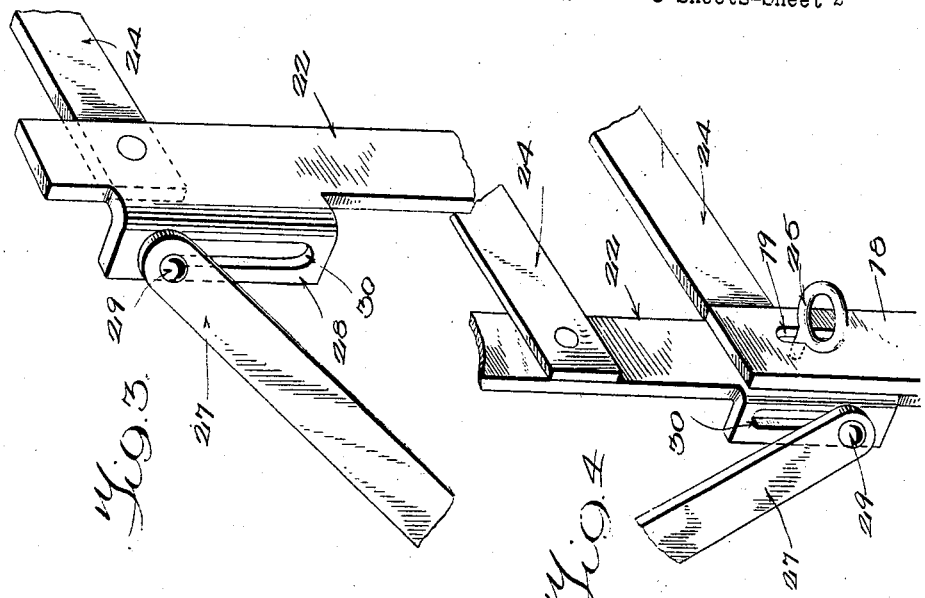
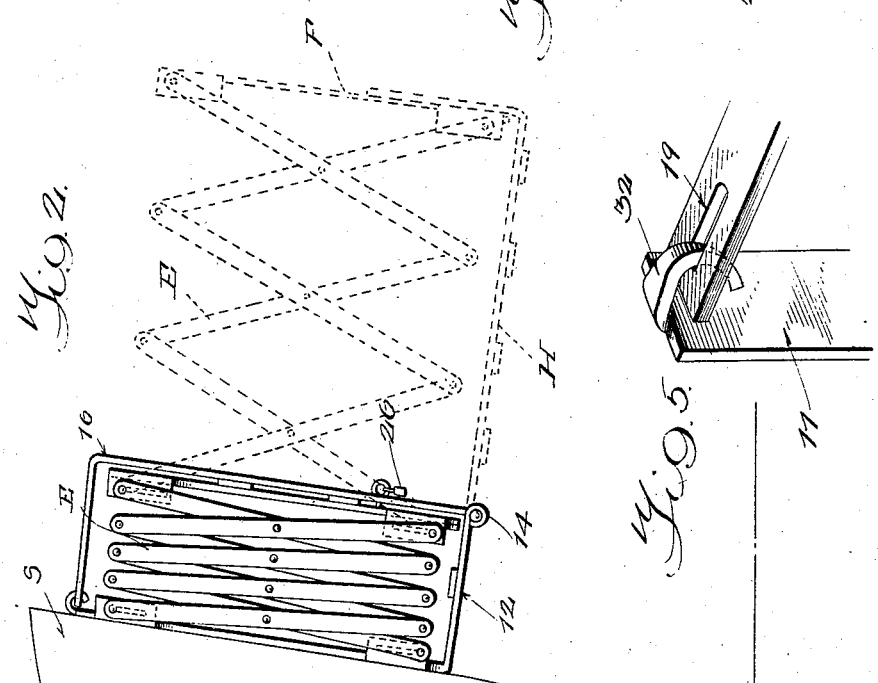
WITNESSES
INVENTOR
Wm. Henry,
BY
ATTORNEYS

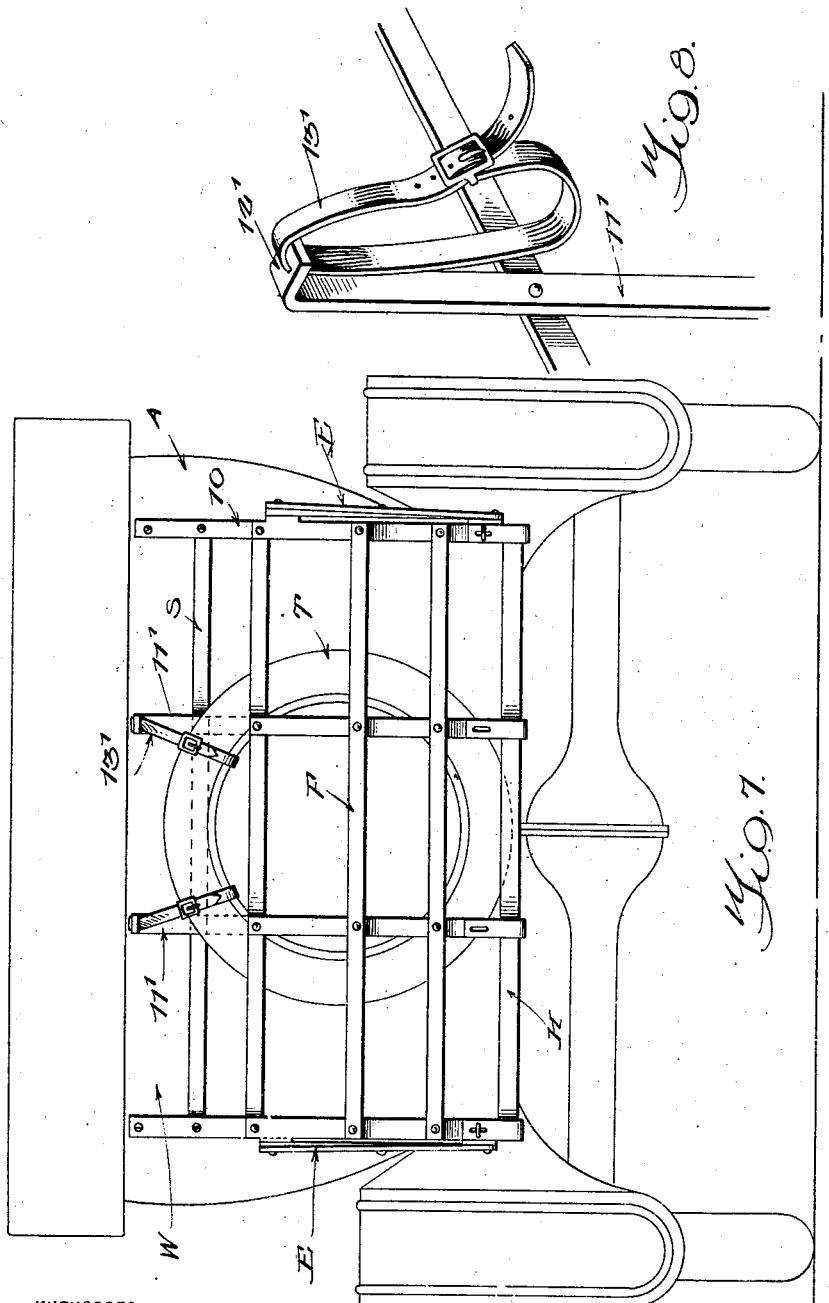

Patented Apr. 8, 1924.

1,489,527

UNITED STATES PATENT OFFICE.

WILLIAM HENRY, OF ROCKFORD, ILLINOIS.

CARRYALL FOR MOTOR VEHICLES.

Application filed March 24, 1922. Serial No. 546,423.

*To all whom it may concern:*

Be it known that I, WILLIAM HENRY, a citizen of the United States, and a resident of Rockford, in the county of Winnebago and State of Illinois, have invented certain new and useful Improvements in Carryalls for Motor Vehicles, of which the following is a specification.

This invention relates to carry-alls for motor vehicles.

One of the objects of the invention is to provide a device of the above character which may be attached to any suitable and desirable position upon a motor vehicle, which is adapted to be folded into a compact unit when not in use, which is adapted to be extended or unfolded for carrying articles or packages of any kind or nature and which is adapted to be made into different sizes and of different strength for carrying articles of different size and weight.

It is also an object of the invention that the device be durable and inexpensive to manufacture.

Other objects and objects relating to details of construction will hereinafter appear in the detailed description to follow.

The invention is illustrated by way of example in the accompanying drawings, in which, Figure 1 is an enlarged perspective view showing the carry-all when mounted upon the back of the front seat of an automobile.

Figure 2 is a view in side elevation of the same showing the carry-all in full lines when folded and in dotted lines when extended.

Figures 3 and 4 are detailed views showing the manner in which the lazy tongs ends of the carry-all are connected to the outer side frame.

Figure 5 is a detailed view showing the manner in which the device is locked in folded position.

Figure 6 is a detailed view illustrating the manner in which the bottom of the device is hinged to the supporting side.

Figure 7 is a rear end elevation showing a modified form of the device secured to the rear end of an automobile.

Figure 8 is a detailed view illustrating the manner of attaching the straps to the device for supporting a spare tire.

Referring to the drawings generally A indicates the body of an automobile, S′ the back of the front seat thereof and W the rear end of the automobile body.

Referring to the Figures 1 to 6 inclusive, the carry-all comprises a supporting frame S, a hinged frame H, a foldable frame F and the two end lazy tongs structures E. More particularly the supporting frame S comprises a pair of end supporting straps 10 and an intermediate supporting strap 11 each of which is formed at its lower end with an outwardly extending projection 12 to form a strap in the shape of an L. The straps are all rigidly secured together by the strips 13. The supporting frame S may be secured to the back of the front seat as shown in Figures 1 and 2 by the means of screws or the like, said screws extending through openings provided in the straps 10 and 11.

Each portion 12 of the straps 10 and 11 terminates in a sleeve portion 14 which is formed therewith as best illustrated in Figure 6 and through these sleeves there is extended or journaled a rod 15.

The hinged frame H serves as a bottom for the carry-all when extended and comprises the two end cross members 16 and the intermediate cross member 17, each of which is formed at its outer end with an upwardly extending portion 18 which is slotted as at 19. The inner end of each of the members 16 and 17 is formed with a tang 20 (Figure 6) which is extended through a suitable recess in the associated sleeve 14 of the straps 10 and 11 and about the shaft 15 whereby to form a hinge connection for the frame H with the frame S. The cross members 16 and 17 are secured together by the longitudinally extending strips 21.

The foldable frame F consists in two end cross members 22 and the intermediate cross member 23 which are secured together by the longitudinally extending strips 24. The lowermost strip 24 is secured at a point a substantial distance from the ends of the cross members 22 and 23 as illustrated in Figures 1 and 4 and the free end portions of the cross members 22 and 23 are adapted to register with the upwardly extending portions 18 of the cross members 16 and 17 of the hinge frame H. An eye-screw 25 is provided for each end cross member 16 of the hinge frame H, said eye-screw in each instance being extended through the slot 19 of the upwardly extended portion 18 and threaded into a suitable opening in the associated frame member 22 whereby to secure the frame F to the frame H. The slots 19 are of such a length that upon the eye-screws being turned with the ring portions thereof in alinement with the slot they may pass therethrough. A padlock 26 is provided for each eye-screw 25 whereby to eliminate any possibility of the frame F being detached from the frame H unless such is intended.

Each lazy tongs structure E consists in a plurality of links pivotally connected together in the usual manner and the end links 27 of each structure each having its free end slidably connected with an ear 28 formed upon the associated cross members of the frames S and H. The free end of the end link is connected to the associated ear 28 by a rivet 29 extending through a slot 30 in said ear.

For locking the carry-all in its folded position the middle supporting strap 11 is provided with a hook 32 which is adapted to engage in the slot 19 of the intermediate cross member 17 of the hinge frame H.

In the operation of the present device, assuming that the same is in its unfolded or extended position as illustrated in Figure 1 of the drawings and that it is desired to fold the same, the padlocks 26 should be removed to permit the frame F to be disconnected from the frame H and thus permit the lazy tongs E to be folded carrying therewith the frame F to bring the same in close proximity to the supporting frame S. The frame H may now be swung upwardly upon its hinge and brought to a vertical position. The cross member 17 of the frame H may now be engaged by the hook 32 carried by the intermediate supporting strap 11 of the frame S, said hook extending through the slot 19 of said cross frame member and rigidly holding the device in its closed or folded position. When it is desired to extend the device, the operation described will, of course be reversed.

Referring to Figures 7 and 8 of the drawings, the device secured to the rear end of the automobile body is of substantially the same construction as the device shown and described in Figures 1 to 6 inclusive and similar reference characters refer to similar parts. In this instance, however, the different frames comprising the device are enlarged and made of stronger material. Also the intermediate supporting straps in this instance are two in number as at 11' and each strap has its upper end formed with a rearwardly turned portion 12' in which there is provided a slot through which a strap 13' may be extended. The straps 13' may be utilized for supporting a spare tire T. The carry-all as illustrated in Figure 7 is extended and ample room is given for the storage of packages or large articles which it is desired to transport.

While I have herein shown and described the preferred form of my invention I wish it to be understood that I am aware of the fact that the construction, combination and arrangement of parts may be changed by those skilled in the art without departing from the spirit of the invention as indicated by the appended claims.

What I claim is:

1. A basket of the character described, comprising a stationary side wall, a movable side wall, collapsible end walls therebetween adapted to permit the movable side wall to be moved to a position in close relation to the stationary side wall, a bottom for said basket adapted to be swung upwardly and against the movable side wall when in its last named position, an extension carried by the bottom, and a hook carried by the stationary side wall adapted to engage said extension whereby to lock the bottom in its last named position.

2. A basket of the character described, comprising a stationary side wall, a movable side wall, collapsible end walls therebetween adapted to permit the movable side wall to be moved to a position in close relation to the stationary side wall, a bottom for said basket adapted to be swung upwardly and against the movable side wall when in its last named position, a slotted extension carried by said bottom, and a hook carried by said stationary wall adapted to engage the slotted extension whereby to lock the bottom wall in its last named position.

3. A basket of the character described, comprising a stationary side wall, a movable side wall, collapsible end walls between said side walls, a bottom for said basket, upstanding members at the outer end of the bottom wall with respect to the movable side wall, and means carried by the movable side wall whereby the same may be detachably secured to said upstanding members.

4. A basket of the character described, comprising a stationary side wall, a movable side wall, collapsible end walls between said side walls, a bottom for said basket, upstanding members at the outer end of the bottom wall with respect to the movable side wall, and turnable eyes carried by the movable side wall and adapted to be extended through slots in the upstanding members of the bottom and then rotated whereby to lock the movable side wall to said upstanding members.

WILLIAM HENRY.